Patented July 8, 1941

2,248,465

UNITED STATES PATENT OFFICE 2,248,465

PROCESS FOR THE REDUCTION OF FATTY ACIDS TO ALCOHOLS

Wilhelm Rittmeister, Dessau, Anhalt, Germany, assignor, by mesne assignments, to American Hyalsol Corporation, Wilmington, Del., a corporation of Delaware No Drawing. Application December 16, 1937, Serial No. 180,171. In Germany December 19, 1936

9 Claims. (Cl. 260—638)

It is known that free carboxylic acids may be reduced by means of hydrogen under increased pressure and in the presence of hydrogenation-catalysts, to the corresponding alcohols, and that this reduction can be also carried out in the presence of low aliphatic alcohols.

However, when operating in accordance with the aforesaid methods the free carboxylic acids. particularly the fatty acids, very seriously injure the hydrogenation-apparatus, unless the latter be made of very expensive special steels normally resistant to fatty acids, and even these special steels will in course of time not remain perfectly resistant to the corrosive action of hot fatty acids. The catalysts during continuous reduction are damaged also and are sometimes even very rapidly destroyed.

Now it has been found that it is possible to eliminate the disadvantageous corrosive effect of the free fatty acids upon the materials the apparatus is made of and upon the catalysts. This is achieved by admixing with the free fatty acids—either before or in the reaction chamber—certain alcohols, the boiling points of which are not more than 50° C. below that of the fatty acids used, and preferably in such amounts that they would theoretically suffice to form a neutral ester of the fatty acids. Thereafter the mixture is subjected to catalytic reduction with hydrogen.

Among the alcohols that can be employed are: aliphatic, aromatic, hydroaromatic, cycloaliphatic, mono- and poly-valent alcohols. In general, alcohols which easily form esters with the fatty acids may be used, but their boiling-point should not be too much under that of the fatty acid being reduced. The best results will be obtained when the boiling point of the alcohols used is approximately the same as that of the acid being reduced. Alcohols having boiling points above those of the acids being reduced may be used advantageously also.

It is advisable to use the alcohol obtained from the reduction of the fatty acids with the same fatty acids. In this way there is no need of separating the reaction-product from the addition agent.

The amount of the alcohol to be admixed with the fatty acid should be large enough to suffice for the formation of the neutral ester of the fatty acid. However, it is preferable to apply an excess of alcohol.

In the alternative, certain alcohol mixtures may be used with the fatty acids or with fatty acid mixtures. It is also possible to supply the alcohols and the fatty acids to the reaction chamber and to admix them therein.

Example 1

Hydrogen and a natural mixture of the fatty acids separated from cocoa-oil was continuously conveyed over a copper-zinc catalyst while being kept at a temperature of 260° C. and at a pressure of 200 atmospheres whereby the acid was reduced to the corresponding alcohols. After an experimental period of ten hours the first signs of a destruction of the catalyst could be observed through the presence of particles of the catalyst in the fatty alcohol reaction product. After a trial period of 36 hours a nearly complete destruction of the catalyst was observed and the hydrogenation apparatus, owing to the corrosive action of the free cocoa-fat acids, was found to have become loosened at a joint made of mild iron. Thus the experiment had to be interrupted and upon opening the apparatus appreciable corrosion caused by the free fatty acid was observed.

A mixture of 40 parts by weight of said cocoa-fat acids together with 60 parts by weight of fatty alcohols, such as those obtainable by the reduction of the cocoa-fat acids, was reduced continuously in exactly the same way as in the proceeding experiment in order to compare the results with those obtained therein. After an uninterrupted experimental period of 5 weeks neither the catalyst nor the apparatus showed any signs of corrosion. The reduction of the fatty acid mixture took such a smooth course throughout this trial that it could be prolonged without interruptions.

Example 2

Lauric acid mixed with the same amount of lauryl alcohol can likewise be reduced to alcohol without injuring either the apparatus or the catalyst, while a mixture of equal amounts of lauric acid and butanol show a strong corrosive action.

Example 3

Lactic acid mixed with the same amount of butanol can be reduced to butanol without any trouble, whereas lactic acid alone or lactic acid mixed with the equivalent amount of methyl alcohol show a corrosive action.

Example 4

Mixtures of 40 parts by weight of capronic acid with 60 parts by weight of methyl cyclohexanol or 67 parts by weight of caprylic acid with 33 parts by weight of 1,5-pentandiol can likewise be reduced without perceptible corrosive action.

When the hydrogenation is not continuous the same phenomenon can be observed as with the continuous method.

Fatty acids which may be reduced according to the prescribed process are for instance butyric acid, caprylic acid, lauric acid, stearic acid, oleic acid, ricinoleic acid, fatty acid mixtures obtained from coconut oil, palmkernel oil, linseed oil or the like and fatty acid mixtures obtained by the oxidation of paraffin or mineral oils.

Alcohols which may be added to the fatty acids before the reduction are for instance butanol, octyl alcohol, dodecyl alcohol, cetyl alcohol, stearyl alcohol, oleyl alcohol, ricinoleyl alcohol, glycol, glycerine, pentandiol, cyclohexanol, methylcyclohexanol, tetrahydronaphthol, decahydronaphthol, benzyl alcohol and the like. The alcohols may be substituted partially by the esters of these alcohols with fatty acids such as the lauric acid ester of lauryl alcohol, the butyric acid ester of butanol, the lauric acid ester of methylcyclohexanol and the like.

I claim:

1. Process for the reduction of fatty acids to alcohols which comprises mixing the fatty acids with organic substances of the group consisting of alcohols and mixtures of alcohols with esters of the alcohols of the same number of carbon atoms as, and of corresponding structures to, the acids undergoing reduction and hydrogenating the mixtures in the presence of hydrogenation catalysts.

2. Process for the reduction of fatty acids to alcohols which comprises mixing the fatty acids with alcohols of the group consisting of monovalent and polyvalent alcohols of the aliphatic, cycloaliphatic, aromatic, and hydroaromatic series, said alcohols having substantially the same boiling point as the acids undergoing reduction, and hydrogenating the mixtures in the presence of hydrogenation catalysts.

3. Process for the reduction of fatty acids to alcohols which comprises mixing the fatty acids with mixtures of alcohols and esters of the alcohols having substantially the same boiling point as the acids undergoing reduction and hydrogenating the mixtures in the presence of hydrogenation catalysts.

4. Process for the reduction of fatty acids to alcohols which comprises mixing the fatty acids with alcohols having substantially the same boiling point as the acids undergoing reduction, the amount of which is sufficient to form neutral esters with the fatty acids, and hydrogenating the mixtures in the presence of hydrogenation catalysts.

5. Process for the reduction of fatty acids to alcohols which comprises mixing the fatty acids with alcohols, the boiling point of which is not more than 50° C. below that of the fatty acids used and hydrogenating the mixtures in the presence of hydrogenation catalysts, said alcohols being present in a quantity sufficient to form neutral esters with said acids.

6. Process for the reduction of fatty acids to alcohols which comprises mixing the fatty acids with alcohols having nearly the same boiling point as the fatty acids used and hydrogenating the mixtures in the presence of hydrogenation catalysts, said alcohols being present in a quantity sufficient to form neutral esters with said acids.

7. Process for the reduction of fatty acids to alcohols which comprises mixing the fatty acids with alcohols obtained by the reduction of the fatty acids and hydrogenating the mixtures in the presence of hydrogenation catalysts, said alcohols being present in a quantity sufficient to form neutral esters with said acids.

8. In the reduction of fatty acids to alcohols by high pressure hydrogenation in the presence of a hydrogenation catalyst, the method of reducing the corrosion of the apparatus and the disintegration of the catalysts which comprises mixing said acids with alcohols, said alcohols having a boiling point of not more than 50° C. below that of the acid treated and carrying out the reduction of the acids in the presence of the alcohols, said alcohols being used in a quantity which reduces corrosion of the apparatus and disintegration of the catalyst.

9. The process of reducing fatty acids to alcohols which comprises mixing fatty acids with alcohols having a boiling point of not more than 50° C. below that of the acids treated, said alcohols being present in excess of the amount necessary to form neutral esters with the acids, and hydrogenating the mixture in the presence of a hydrogenation catalyst adapted to reduce said acids to alcohols.

WILHELM RITTMEISTER.